US012611583B2

(12) United States Patent
Santos et al.

(10) Patent No.: US 12,611,583 B2
(45) Date of Patent: Apr. 28, 2026

(54) SWIM SPA JET PROPULSION SYSTEMS AND METHODS

(71) Applicant: BULLFROG INTERNATIONAL, LC, Herriman, UT (US)

(72) Inventors: Robert Santos, South Jordan, UT (US); Richard Alex Eddington, South Jordan, UT (US); Evan Smail, West Jordan, UT (US); Mark McLane, Lehi, UT (US)

(73) Assignee: Bullfrog International, LC, Herriman, UT (US)

( * ) Notice: Subject to any disclaimer, the term of this patent is extended or adjusted under 35 U.S.C. 154(b) by 82 days.

(21) Appl. No.: 18/726,730

(22) PCT Filed: Mar. 14, 2023

(86) PCT No.: PCT/US2023/015207

§ 371 (c)(1),
(2) Date: Jul. 3, 2024

(87) PCT Pub. No.: WO2023/177679

PCT Pub. Date: Sep. 21, 2023

(65) Prior Publication Data

US 2025/0090924 A1 Mar. 20, 2025

Related U.S. Application Data

(60) Provisional application No. 63/319,548, filed on Mar. 14, 2022.

(51) Int. Cl.
*A63B 69/12* (2006.01)
*A61H 33/00* (2006.01)

(52) U.S. Cl.
CPC ....... *A63B 69/125* (2013.01); *A61H 33/0087* (2013.01)

(58) Field of Classification Search
CPC .... A61H 33/0087; A47K 3/10; E04H 4/0006; A63B 69/125
See application file for complete search history.

(56) References Cited

U.S. PATENT DOCUMENTS 1,731,554 A * 10/1929 Wheeler .............. A63B 69/125 4/491
4,001,899 A * 1/1977 Mathis .................... E04H 4/145 4/493

(Continued)

FOREIGN PATENT DOCUMENTS

CN 1153856 A 5/2002
DE 3921015 C1 8/1990

OTHER PUBLICATIONS

USPTO acting as International Searching Authority, "Search Report and Written Opinion," International Application No. PCT/US2023/015207, Jun. 27, 2023.

(Continued)

*Primary Examiner* — Erin Deery
(74) *Attorney, Agent, or Firm* — Dentons Durham Jones Pinegar; Sarah W. Matthews

(57) ABSTRACT

A system and method for circulating water in a swim spa. A recessed chamber formed in the shell of the spa defines a space to hold at least a portion of a first, upper horizontal water propulsion device and at least a portion of a second, lower vertical water propulsion device. The first, upper horizontal flow of water is combined with the second, lower vertical flow of water to create a third, horizontal flow of water. The resulting turbulence is lower, creating a more laminar flow and better user swimming experience. Jet bodies with side intakes may maximize capacity of the water propulsion devices.

20 Claims, 7 Drawing Sheets

(56) References Cited

U.S. PATENT DOCUMENTS

| | | | |
|---|---|---|---|
| 4,903,352 | A | 2/1990 | Murakami |
| 5,044,021 | A | 9/1991 | Murdock |
| 9,855,479 | B2 * | 1/2018 | Cameron ................ F04D 13/06 |
| 10,688,505 | B2 * | 6/2020 | Badita .................. A63B 69/125 |
| 11,946,277 | B2 * | 4/2024 | Hall .......................... E04H 4/12 |
| 2003/0024041 | A1 | 2/2003 | Eddington et al. |
| 2007/0289057 | A1 | 12/2007 | Ludlow |
| 2011/0004993 | A1 * | 1/2011 | Frei ........................... F04F 5/10 4/492 |
| 2012/0037248 | A1 | 2/2012 | Hof |
| 2015/0074895 | A1 * | 3/2015 | Harder ..................... A47K 3/10 4/492 |
| 2017/0204628 | A1 | 7/2017 | Livingstons, Jr. |

OTHER PUBLICATIONS

European Patent Office, “Extended Search Report” for European Patent Application No. 23771329.2, Mar. 20, 2025.

* cited by examiner

SWIM SPA JET PROPULSION SYSTEMS AND METHODS

CROSS-REFERENCE TO RELATED APPLICATION

This application is a U.S. national stage application under 35 U.S.C. 371 of PCT/US2023/015207 ("the '207 PCT Application"), filed Mar. 14, 2023, titled SWIM SPA JET PROPULSION SYSTEMS AND METHODS, which claims priority to U.S. Provisional Patent Application 63/319,548, filed Mar. 14, 2022, and titled SWIM SPA JET PROPULSION SYSTEMS AND METHODS ("the '548 Provisional Application") is hereby made. The contents of the '207 PCT Application and the '548 Provisional Application are hereby incorporated herein in their entireties.

TECHNICAL FIELD

The present disclosure relates generally to spas. More specifically, the present disclosure relates to systems and methods to create a circulating water flow used in swim-type spas.

BACKGROUND

Water exercise, such as swimming, is popular for many reasons. Water provides resistance to movement to help strengthen the user's muscles, while reducing the risk of injury due to balance issues. Exercise in water may be especially helpful in cases where other types of exercise, such as jogging, running, cycling, etc., is not possible due to pain, decreased bone density, disability, etc. The buoyancy in water counteracts gravity and places less stress on the user's skeletal and muscular system.

Typically to exercise in a pool, users either must have substantial yard space for their own private pool or must use a public or shared pool. For users with limited space, an alternative is a swim spa. Such swim spas (or pools) typically include an outlet at the head end of the pool from which a jet of water is directed toward a swimmer (the terms "head end" and "foot end" are used herein with respect to the orientation of a swimmer within the pool). The swim spa uses pumps to circulate water from the swim spa out jets at the head end of the swim spa towards the foot end, creating a current within the swim spa which the user swims against. The user is able to swim in place against the variable current of water that is directed at them from the head end of the pool.

A laminar flow of water within a swim spa can be difficult to achieve. Laminar flow is a type of flow pattern of a fluid in which all the particles are flowing in parallel lines, as opposed to turbulent flow, where the particles flow in random and chaotic directions. Swim spas often have a more turbulent flow, causing users to move off-center within the spa and potentially hitting the sides of the spa. Although the problem has been addressed, it has not been solved and current solutions are both complex and expensive.

A simple, efficient jet propulsion system that produces a smooth flow of water within the swim spa is needed.

SUMMARY OF DISCLOSURE

According to the present disclosure, a system for circulating water in a swim spa can comprise: a recessed chamber formed in a shell of the swim spa, the recessed chamber defining a space to hold at least a portion of a first, upper horizontal water propulsion device and at least a portion of a second, lower vertical water propulsion device; the first, upper horizontal water propulsion device comprising a first water propulsion body, the first water propulsion body being directed in a horizontal direction to create a first, horizontal flow of water having a first turbulence, the first water propulsion body having an inlet end and an outlet end, the outlet end in fluid communication with the recessed chamber, the first water propulsion body having at least one intake opening between the inlet end and the outlet end, the at least one intake opening to allow stagnant water to be pulled into the first water propulsion body through the at least one intake opening and pushed out into the recessed chamber through the outlet end of the first water propulsion body; the second, lower vertical water propulsion device comprising a second water propulsion body, the second water propulsion body being directed in a vertical direction to create a second, vertical flow of water having a second turbulence, the second water propulsion body having an inlet end and an outlet end, the outlet end in fluid communication with the recessed chamber, the second water propulsion body having at least one intake opening between the inlet end and the outlet end, the at least one intake opening to allow stagnant water to be pulled into the second water propulsion body through the at least one intake opening and pushed out into the recessed chamber through the outlet end of the second water propulsion body; and wherein the second, lower vertical water propulsion device is positioned below the first, upper horizontal water propulsion device, such that the second, vertical flow of water combines with the first, horizontal flow of water to create a third, horizontal flow of water having a third turbulence, and wherein the third turbulence is less than the first turbulence and less than the second turbulence.

According to one aspect, the vertical direction comprises an angle between 45 degrees and 90 degrees.

In other configurations, a system for circulating water in a swim spa comprises: a recessed chamber formed in a shell of the spa, the recessed chamber defining a space to hold at least a portion of a first, upper horizontal water propulsion device and at least a portion of a second, lower vertical water propulsion device; the first, upper horizontal water propulsion device comprising a first water propulsion body, the first water propulsion body being directed in a horizontal direction to create a first, horizontal flow of water having a first turbulence; the second, lower vertical water propulsion device comprising a second water propulsion body, the second water propulsion body being directed in a vertical direction to create a second, vertical flow of water having a second turbulence; and wherein the second, lower vertical water propulsion device is positioned below the first, upper horizontal water propulsion device, such that the second, vertical flow of water combines with the first, horizontal flow of water to create a third, horizontal flow of water having a third turbulence, and wherein the third turbulence is less than the first turbulence and less than the second turbulence.

A method for circulating water in a swim spa can include: providing a recessed chamber formed in a shell of the spa, the recessed chamber defining a space to hold at least a portion of a first, upper horizontal water propulsion device and at least a portion of a second, lower vertical water propulsion device; creating a first, upper horizontal flow of water having a first turbulence; creating a second, lower vertical flow of water having a second turbulence; and combining the first, upper horizontal flow of water with the second, lower vertical flow of water to create a third, horizontal flow of water having a third turbulence, and wherein the third turbulence is less than the first turbulence and less than the second turbulence.

The method may also include discharging the third, horizontal flow of water from an outlet at a head end of the swim spa into a swimming compartment, the third, horizontal flow of water flowing in a primary flow path toward a foot end of the swimming compartment.

BRIEF DESCRIPTION OF DRAWINGS

The drawings are illustrative and not limiting of the scope of the invention which is defined by the appended claims. The components in the drawings are not necessarily to scale relative to each other. Like reference numerals designate corresponding parts throughout the several views.

DETAILED DESCRIPTION

The present disclosure relates generally to systems and methods for creating a horizontal flow of water in a swim spa. As used herein, "spa" or "swim spa" refers to a hot tub, swim spa, pool, and/or a jetted tub, whether in ground or aboveground. While the jet propulsion and methods described herein are described in reference to a swim spa, they may be similarly used in conjunction with a pool or other swimming system, or in other applications. Similarly, "spa shell" refers to the outer shell or structure of the spa, and encompasses the outer structure of a spa or any other swimming vessel that holds water, such as the outer structure of a pool, etc. Thus, "spa shell" means the shell of a spa, the deck of a pool, and other equivalents. Similarly, a "shell" means any vessel capable of holding water. As used herein, the "inside" of the shell or spa shell is the side that faces a user and forms the layer that holds the water within the spa or other vessel. The inside of the spa shell holds water while in use. The "inner side" of the spa shell faces the inside of the of the spa shell. The "outside" or "underside" of the shell or spa shell is the side that is faced away from a user when the user is within the spa. The "outer side" of the spa shell faces the outside of the spa shell. Additionally, as used herein a "horizontal" means the direction a user would swim in while inside the swim spa. "Vertical" means orthogonal to the horizontal, within a range of 45 degrees.

Figure 1:
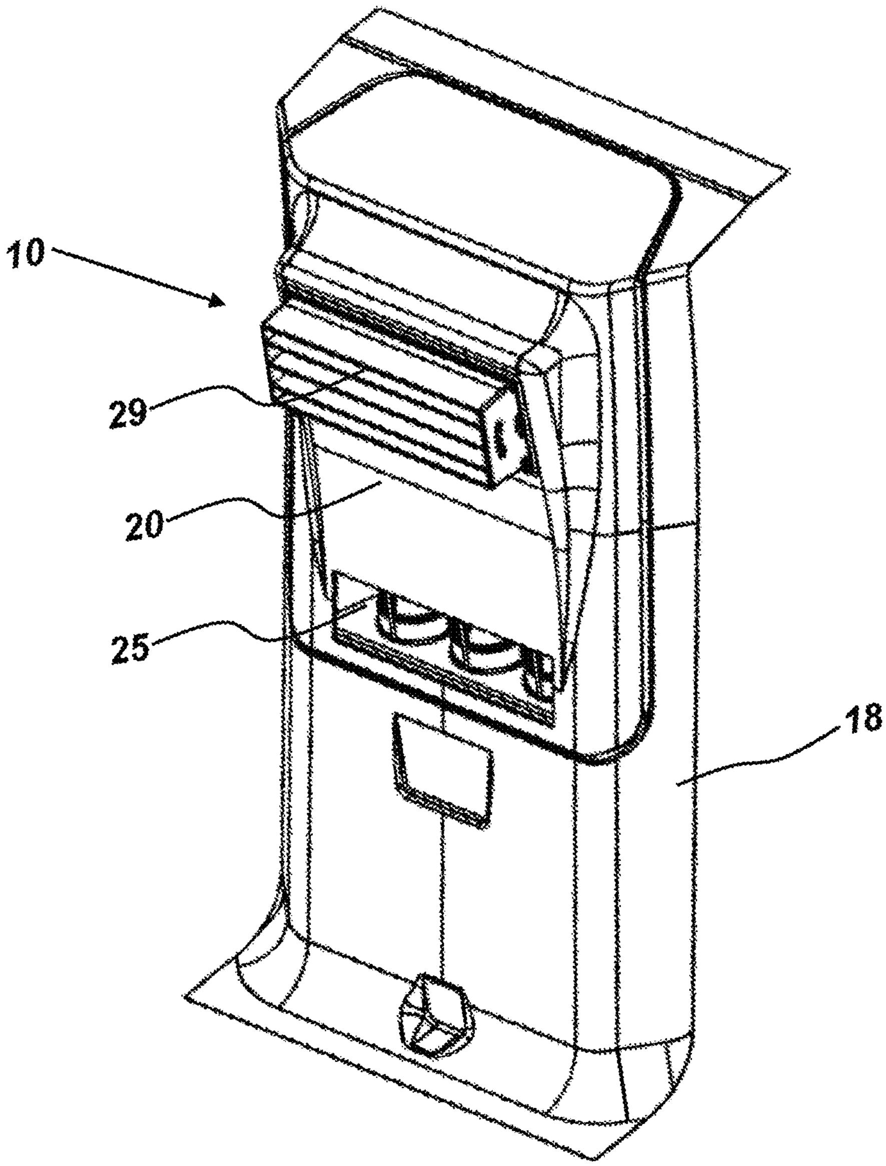
FIG. 1 is a perspective view of a swim spa water propulsion system.
Figure 2:
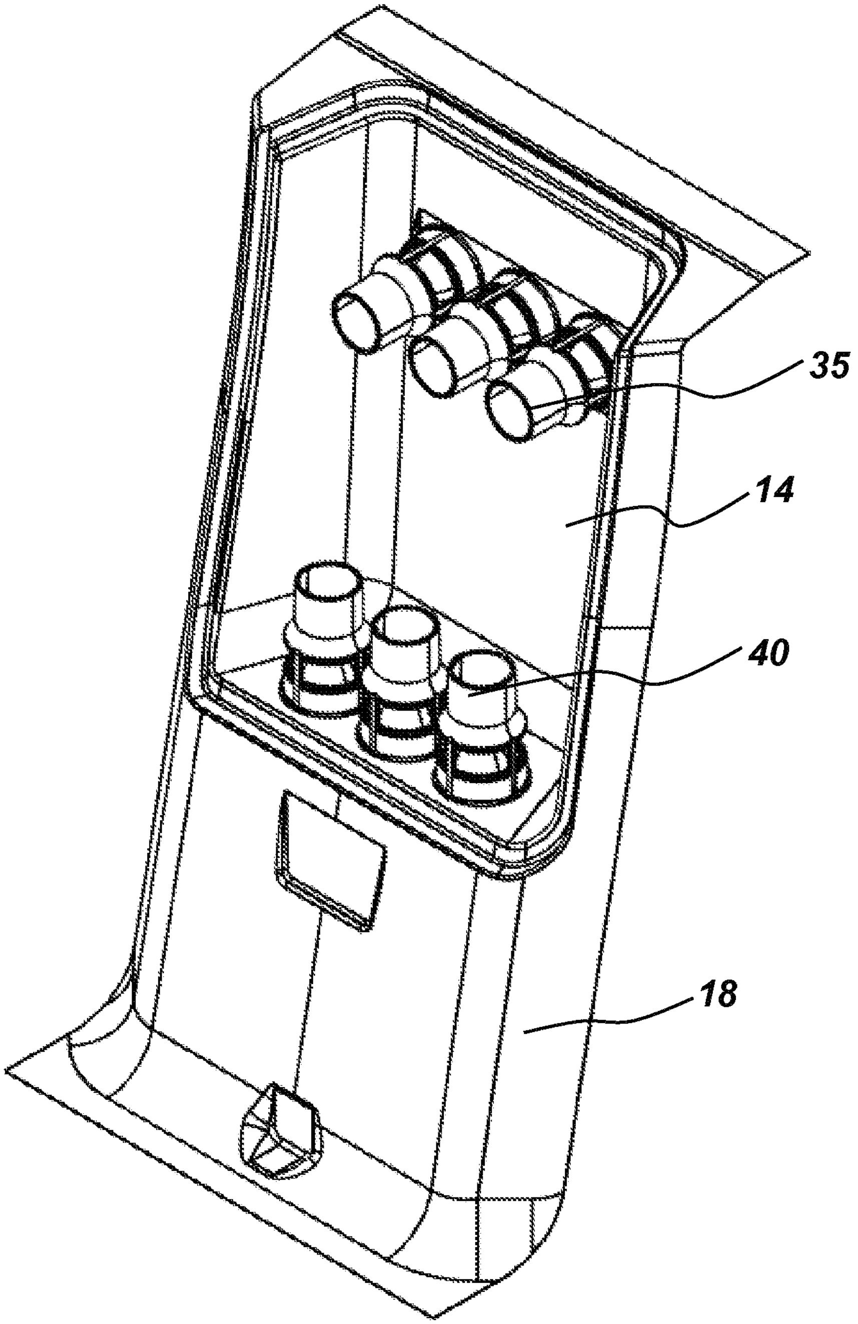
FIG. 2 is a perspective view of the system of FIG. 1, with the cover or panel removed to show the inner structures.
Figure 3:
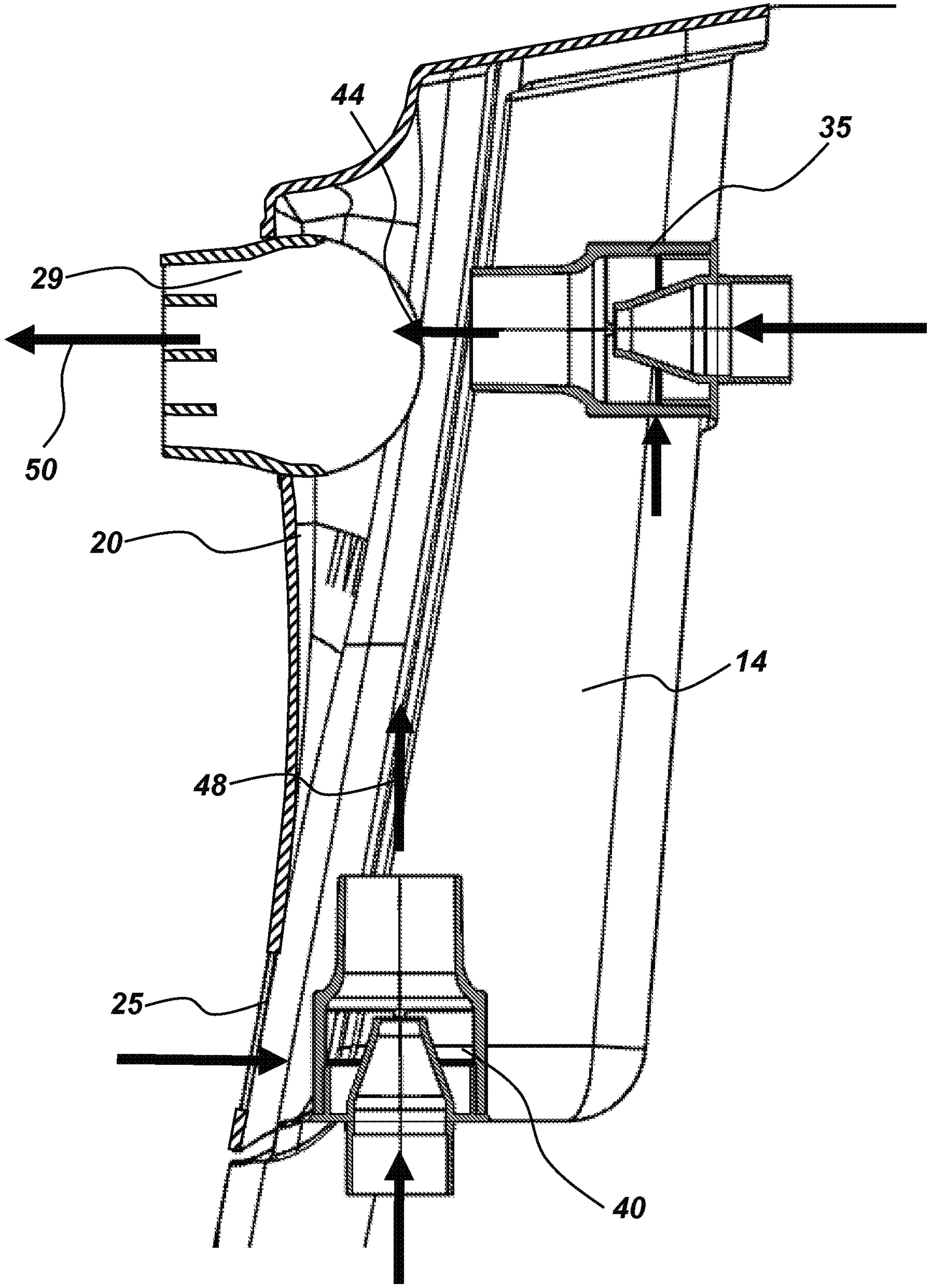
FIG. 3 is a cross-section view of the interior chamber of the system of FIGS. 1-2.

FIGS. 1-3 show a configuration of a swim spa jet propulsion system 10. In this configuration, the system is generally located within a recessed chamber 14 of the spa 18. This allows the jet propulsion system 10 to be within the spa 18 while minimizing penetrations through the spa shell for plumbing. The system 10 can also be placed in other locations in the swim spa in addition to a recessed chamber.

A plate or cover 20 is provided in front of the recessed chamber 14 (cover 20 removed in FIG. 2). The cover 20 has an inlet 25 that allows water to be drawn into the recessed chamber 14 through the Venturi effect of the jets, as explained in more detail below. The cover 20 also includes an outlet 29. The outlet 29 may comprise a non-adjustable outlet or an adjustable outlet, such as a louvre or other adjustment member to allow a user to adjust the direction of flow of water from the outlet 29. This may allow a user to adjust how much of the water flow from the outlet 29 flows from above and/or below the user as they swim. The cover may be removable to access chamber 14, or the cover may be non-removable. Alternatively, there may be no cover.

Within the recessed chamber 14, one or more sets of water propulsion devices may be provided. The number can vary depending on the particular water flow effects desired. In FIGS. 1-2, there are two separate sets of water propulsion devices (such as jets) at least partially housed within the recessed chamber 14. A first, upper set of horizontal water propulsion devices 35 is at least partially housed within chamber 14, and is located above a second, lower set of vertical water propulsion devices 40. The set(s) of water propulsion devices may be formed of a single jet, two jets, three jets, or four or more jets. In the configuration shown in FIGS. 1-3, the set of upper and lower water propulsion devices are formed of three water propulsion devices.

The horizontal water propulsion devices 35 create a first, horizontal flow or generally horizontal flow of water (indicated at arrow 44 in FIG. 3) that has a first turbulence. The first, horizontal flow may be, for example, within 20 degrees above or below horizontal. The vertical water propulsion devices 40 create a second, vertical flow or generally vertical flow of water (indicated at arrow 48 in FIG. 3) that has a second turbulence. Due to the placement of the vertical water propulsion devices 40 below and inward relative to the horizontal water propulsion devices 35, the second, vertical flow of water 48 intersects with, or interrupts, the first, horizontal flow of water 44. This creates a third, horizontal flow of water (indicated at arrow 50) having a third turbulence. It has been found that by "interrupting" the horizontal flow of water 44 with a vertical flow 48 as described herein, the turbulence of the resulting water flow 50 is diminished, resulting in a more laminar flow of water and a more pleasant swimming experience for the user. That is, the first, horizontal flow of water 44 combines with the second, vertical flow of water 48, to create a third, horizontal flow 50 of water that is more laminar than the first, horizontal flow of water 44.

The lower vertical water propulsion devices 40 may be placed at different positions within chamber 14 (or outside chamber 14 in configurations which do not provide a chamber 14). The placement of lower, vertical water propulsion device(s) 40 may be at any position such that the flow or stream of water created by the lower, vertical water propulsion device(s) 40 flows upward and into the flow or stream of water produced by the upper, horizontal water propulsion device(s) 35. For example, the lower, vertical water propulsion device(s) may be placed at least 15 centimeters below the upper, horizontal water propulsion device(s) 35, at least 30 centimeters below the upper, horizontal water propulsion devices, etc. In other configurations, the vertical water propulsion devices may be placed above the horizontal water propulsion devices and flow downward to interrupt the horizontal water propulsion device(s).

By placing the lower, vertical water propulsion device(s) 40 such that they are directed toward the flow or stream created by the upper, horizontal water propulsion device(s)

35, a combination flow/stream is created. The combination of flows/streams disrupts turbulence generated by either individual flow and provides a more consistent, more laminar output from the outlet 29. Various placement of the lower, vertical water propulsion device(s) 40 relative to the upper, horizontal water propulsion device(s) 35 may be used to achieve the same result. The lower vertical water propulsion device(s) 40 may be directed upwardly at a 90-degree angle, or can be set at a lower angle, such as 80 degrees, 70 degrees, 60 degrees, 50 degrees, etc.

The lower vertical water propulsion devices 40 may be powered at the same power as the upper horizontal water propulsion devices(s) 35. Or, the lower vertical water propulsion devices may be powered less than the upper horizontal water propulsion devices. For example, the lower vertical water propulsion devices 40 may be powered at between 50 percent to 99 percent of the power of the upper horizontal water propulsion device(s) 35. Alternatively, fewer water propulsion device(s) 40 may be provided for the lower vertical water propulsion devices than for the upper horizontal propulsion devices.

Turbulence of the water may be measured by acoustic doppler, velocimeter, etc. and may be measured in units of flow speed, such as mm/s. Alternatively, the Reynolds number may be calculated for the system to approximate laminar and turbulent flow. Laminar flow occurs at low Reynolds numbers, where viscous forces are dominant, and is characterized by smooth, constant fluid motion. Turbulent flow occurs at high Reynolds numbers and is dominated by inertial forces, which tend to produce chaotic eddies, vortices and other flow instabilities.

The Reynolds number is defined as $$Re = \frac{\rho v L}{\mu}$$

where: ρ is the density of the fluid (SI units: kg/m$^3$); v is a characteristic velocity of the fluid with respect to the object (m/s); L is a characteristic linear dimension (m); and is the dynamic viscosity of the fluid (Pa·s or N·s/m$^2$ or kg/(m·s)).

Figure 4:
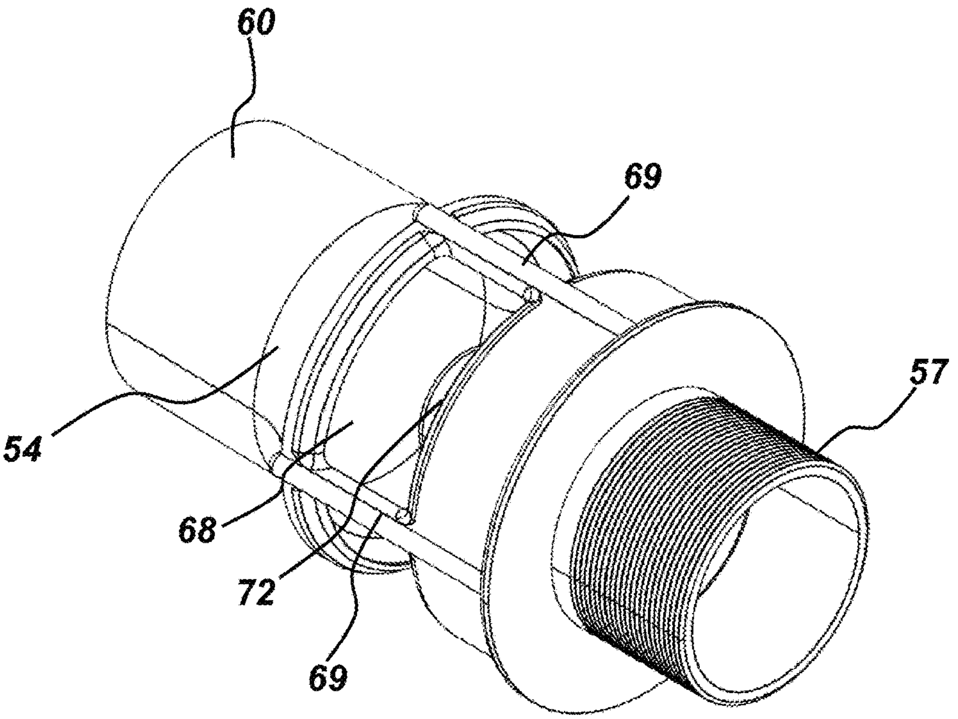
FIG. 4 is a perspective view of a water propulsion body or jet body.
Figure 5:
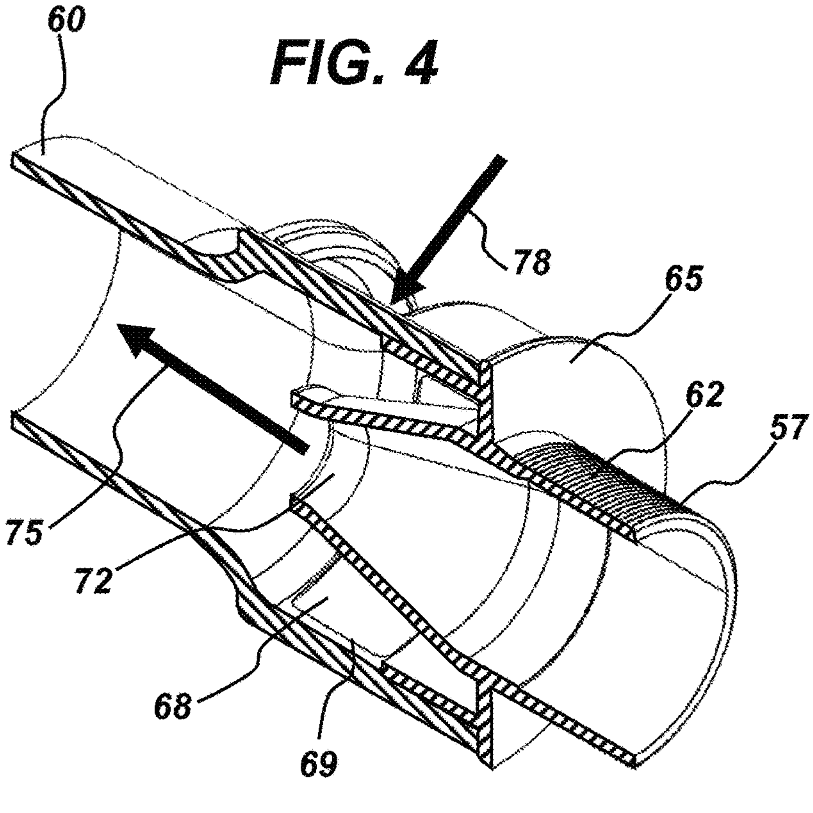
FIG. 5 is a cross-section view of the water propulsion body or jet body shown in FIG. 4.
Figure 6:
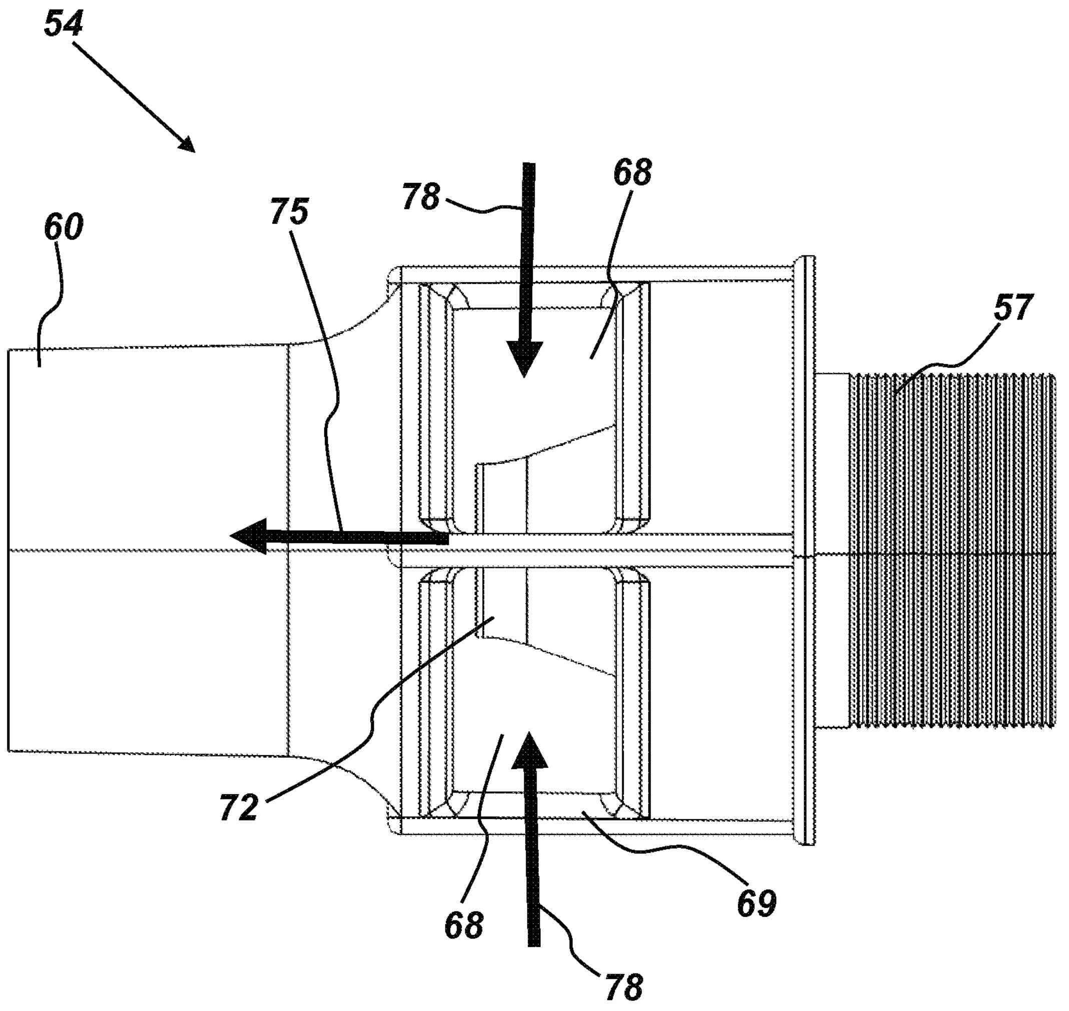
FIG. 6 is a side view of the water propulsion body or jet body shown in FIGS. 4-5.

FIGS. 4-6 illustrate a specific type of water propulsion body 54 or jet body 54 that may be used in conjunction with one or more of the water propulsion devices 35, 40. In the configuration illustrated in FIGS. 1-3, the water propulsion devices 35, 40 are provided with the illustrated jet body 54. Alternatively, only some of the water propulsion devices 35, 40 may be provided with a jet body 54, or none of them may be provided with a jet body 54.

Jet body 54 has an inlet end 57 and an outlet end 60. The inlet end 57 is typically located outside or on the underside of the spa shell. The inlet end 57 may be provided with a threaded portion 62 for connection to a retaining member, tubing, etc. A flange 65 is positioned on the inner side of the spa shell and may help seat the jet body 54 within the interior of the spa shell and prevent the jet body 54 from being removed through the underside of the spa shell. In other configurations, a flange 65 is not provided.

The outlet end 60 is positioned within the chamber 14 such that the outlet end 60 is in fluid communication with the chamber 14. Between the outlet end 60 and the inlet end 57, and in fluid communication with the chamber 14, an intake opening 68 is provided to allow the intake opening 68 to draw in additional stagnant water from chamber 14. As water exits the outlet end 60, it creates a negative pressure that draws additional water from the chamber 14 into the jet body through the intake opening(s) 68 by the Venturi effect. One intake opening 68 may be provided in the jet body 54, or two, or three, or four or more intake opening(s) 68 may be provided. Intake opening(s) 68 may be any suitable shape and size. In the configuration shown in FIGS. 4-6, intake opening(s) 68 comprise a substantially open portion of the jet body 54, with ribs 69 for support.

Intake opening(s) 68 are also positioned proximal to an inner nozzle 72 located within the outer circumference of the jet body 54. Inner nozzle 72 terminates before the outlet end 60 of the jet body 54, and directs water from a jet or other water propulsion means through jet body 54 towards the outlet end 60 as indicated by arrow 75. As the inner nozzle 72 pushes water through the jet body, the negative pressure or vacuum created behind the inner nozzle 72 draws additional water in through intake opening(s) 68 as indicated by arrow 78. This increases the flow capacity of the jet body 54.

Figure 7:
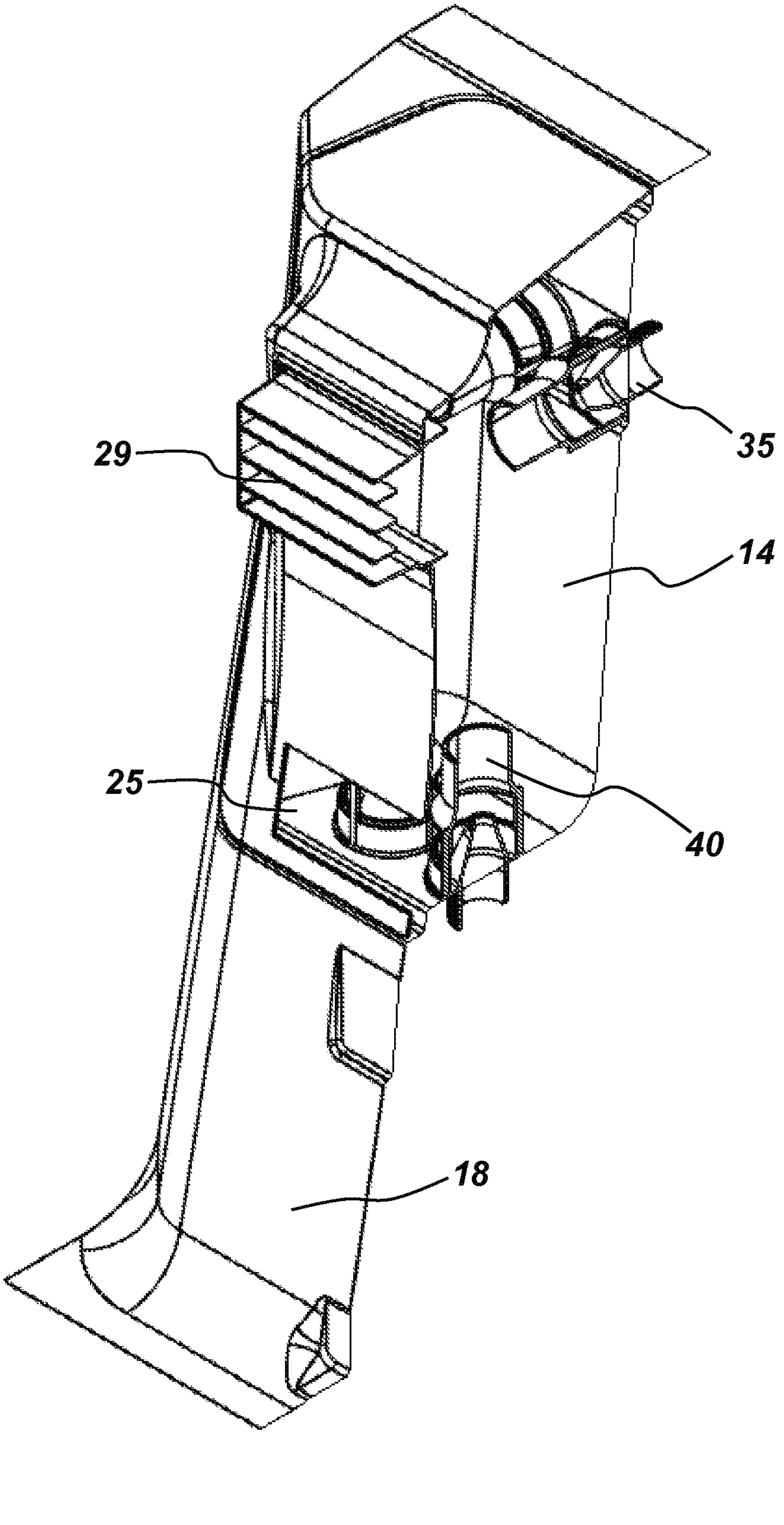
FIG. 7 is a perspective, cross sectional view of the system of FIG. 1.
Figure 8:
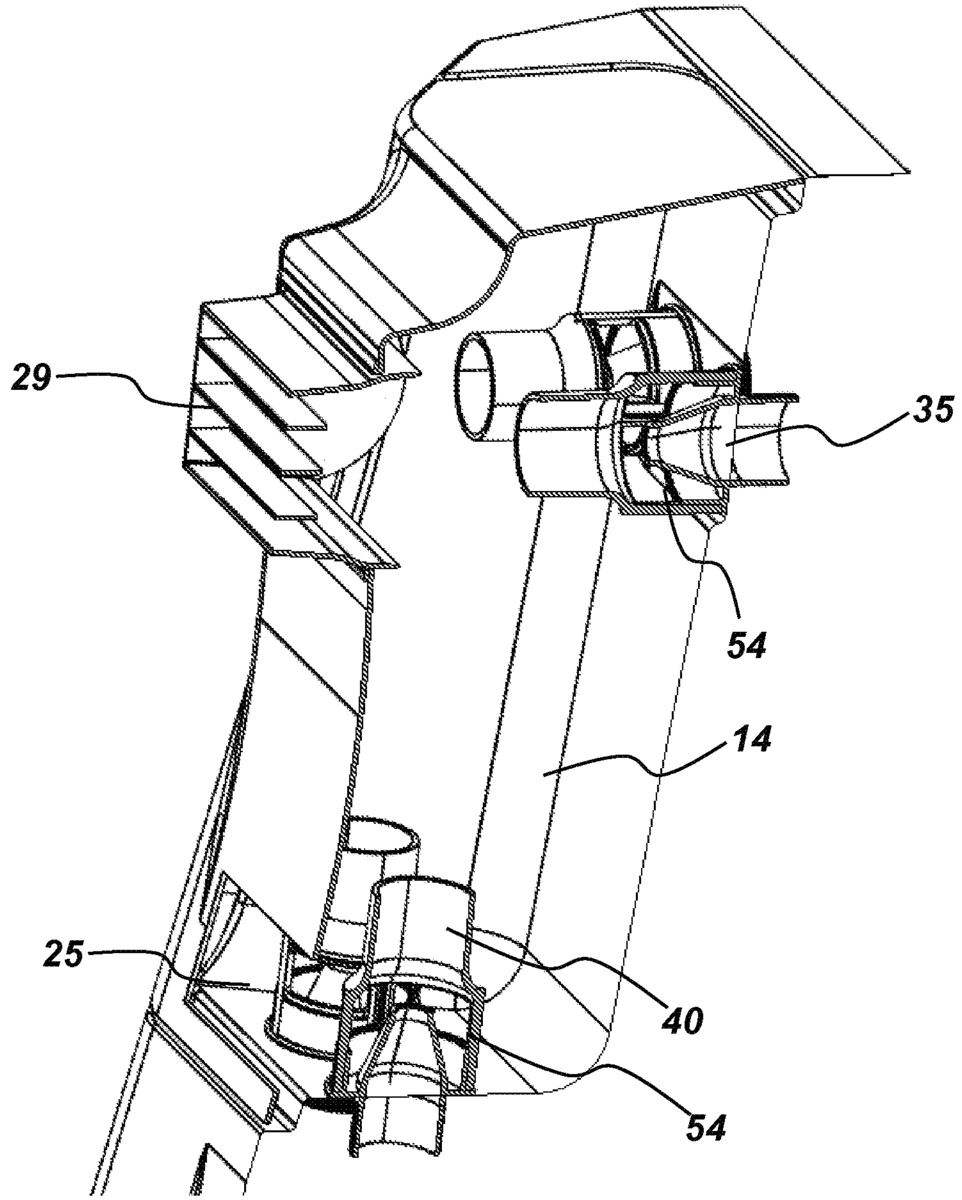
FIG. 8 is a close-up of the perspective, cross section view of the system of FIG. 7.

In use and with reference to the cross-sectional views in FIGS. 7-8, water is pulled from the main body of the spa through the inlet 25 and into the recessed chamber 14. As water is pushed outwardly through the outlet end of lower vertical water propulsion device(s) 40, water is also simultaneously pulled into the jet bodies 54 of such devices. Similarly, as water is pushed outwardly through upper horizontal water propulsion device(s) 35, water is also pulled into the jet bodies to increase the capacity of the flow exiting from the outlet 60 of the jet body 54.

A horizontal flow of water exits the upper horizontal water propulsion device(s) 35, and is interrupted by the vertical flow of water exiting from the lower vertical water propulsion device(s) 40. The resulting horizontal water flow is less turbulent, and exits the outlet 29.

The description is only exemplary of the principles of the present invention, and should not be viewed as narrowing the scope of the claims which follow, which claims define the full scope of the invention. All statements herein reciting principles, aspects, and configurations of the invention, as well as specific examples thereof, are intended to encompass equivalents thereof.

Reference in the specification to "one configuration" or "a configuration" means that a particular feature, structure, or characteristic described in connection with the configuration is included in at least one configuration, but is not a requirement that such feature, structure or characteristic be present in any particular configuration unless expressly set forth in the claims as being present. The appearances of the phrase "in one configuration" in various places may not necessarily limit the inclusion of a particular element of the invention to a single configuration, rather the element may be included in other or all configurations discussed herein.

As used in this specification and the appended claims, singular forms such as "a," "an," and "the" may include the plural unless the context clearly dictates otherwise. Thus, for example, reference to "a jet body" may include one or more of such jet bodies, and reference to "the water flow" may include reference to one or more of such water flows.

As used herein, the term "generally" refers to something that is more of the designated adjective than not, or the converse if used in the negative. As used herein, the term "about" is used to provide flexibility to a numerical range endpoint by providing that a given value may be "a little above" or "a little below" the endpoint while still accomplishing the function associated with the range, for example, "about" may be within 10% of the given number or given range. As used herein, a plurality of items, structural elements, compositional elements, and/or materials may be presented in a common list for convenience. However, these lists should be construed as though each member of the list is individually identified as a separate and unique member.

Numerical data may be expressed or presented herein in a range format. A range format is used merely for convenience and brevity and thus should be interpreted flexibly to include not only the numerical values explicitly recited as the limits of the range, but also to include all individual numerical values or sub-ranges encompassed within that range as if each numerical value and sub-range is explicitly recited. For example, a numerical range of "about 5 to about 60" should be interpreted to include not only the explicitly recited values of about 1 to about 5, but also include individual values and sub-ranges within the indicated range. Thus, included in this numerical range are individual values such as 6, 7, 8, 9, etc., through 60, and sub-ranges such as from 10-20, from 30-40, and from 50-60, etc., as well as each number individually. This same principle applies to ranges reciting only one numerical value as a minimum or a maximum. Furthermore, such an interpretation should apply regardless of the breadth of the range or the characteristics being described. Additionally, the word "connected" and "coupled" is used throughout for clarity of the description and can include either a direct connection or an indirect connection.

While methods are described herein in discrete steps in a particular order for the sake of clarity, the steps do not require a particular order and more than one step may be performed at the same time. For example, a later step may begin before earlier step completes. Or, a later step may be completed before an earlier step is started.

Although the foregoing disclosure provides many specifics, such as use of the system in spas, it will be appreciated that pools, and other water holding devices are contemplated and these should not be construed as limiting the scope of any of the ensuing claims. Other configurations and configurations may be devised which do not depart from the scopes of the claims. Features from different configurations and configurations may be employed separately or in combination. Accordingly, all additions, deletions and modifications to the disclosed subject matter that fall within the scopes of the claims are to be embraced thereby. The scope of each claim is indicated and limited only by its plain language and the full scope of available legal equivalents to its elements.

Furthermore, if any references have been made to patents and printed publications throughout this disclosure, each of these references and printed publications are individually incorporated herein by reference in their entirety.

The invention claimed is:

1. A system for circulating water in a swim spa comprising:

a recessed chamber formed in a shell of the swim spa, the recessed chamber defining a space to hold at least a portion of a first, upper horizontal water propulsion device and at least a portion of a second, lower vertical water propulsion device;

the first, upper horizontal water propulsion device comprising a first water propulsion body, the first water propulsion body being directed in a horizontal direction to create a first, horizontal flow of water having a first turbulence, the first water propulsion body having an inlet end and an outlet end, the outlet end in fluid communication with the recessed chamber, the first water propulsion body having at least one intake opening between the inlet end and the outlet end, the at least one intake opening to allow stagnant water to be pulled into the first water propulsion body through the at least one intake opening and pushed out into the recessed chamber through the outlet end of the first water propulsion body;

the second, lower vertical water propulsion device comprising a second water propulsion body, the second water propulsion body being directed in a vertical direction to create a second, vertical flow of water having a second turbulence, the second water propulsion body having an inlet end and an outlet end, the outlet end in fluid communication with the recessed chamber, the second water propulsion body having at least one intake opening between the inlet end and the outlet end, the at least one intake opening to allow stagnant water to be pulled into the second water propulsion body through the at least one intake opening and pushed out into the recessed chamber through the outlet end of the second water propulsion body; and wherein the second, lower vertical water propulsion device is positioned below the first, upper horizontal water propulsion device, such that the second, vertical flow of water combines with the first, horizontal flow of water to create a third, horizontal flow of water having a third turbulence, and wherein the third turbulence is less than the first turbulence and less than the second turbulence.

2. The system for circulating water in a swim spa of claim 1, wherein the vertical direction comprises an angle between 45 degrees and 90 degrees.

3. The system for circulating water in a swim spa of claim 1, wherein the first water propulsion body further comprises an inner nozzle within an outer circumference of the first water propulsion body.

4. The system for circulating water in a swim spa of claim 1, wherein the second water propulsion body further comprises an inner nozzle within an outer circumference of the second water propulsion body.

5. The system for circulating water in a swim spa of claim 1, further comprising a cover connectable to a front of the recessed chamber.

6. The system for circulating water of claim 5, wherein the cover comprises an inlet for allowing water to be drawn into the recessed chamber via a Venturi effect of the first, upper horizontal water propulsion device and the second, lower vertical water propulsion device.

7. The system for circulating water in a swim spa of claim 1, wherein the swim spa comprises an outlet at a head end of the swim spa, the outlet allowing the third, horizontal flow of water to exit from the outlet into a swimming compartment of the swim spa.

8. A system for circulating water in a swim spa comprising:

a recessed chamber formed in a shell of the swim spa, the recessed chamber defining a space to hold at least a portion of a first, upper horizontal water propulsion device and at least a portion of a second, lower vertical water propulsion device;

the first, upper horizontal water propulsion device comprising a first water propulsion body, the first water propulsion body being directed in a horizontal direction to create a first, horizontal flow of water having a first turbulence, the first water propulsion body having an inlet end and an outlet end, the outlet end in fluid communication with the recessed chamber, the first water propulsion body having at least one intake opening between the inlet end and the outlet end, the at least one intake opening to allow stagnant water to be pulled into the first water propulsion body through the at least one intake opening and pushed out into the recessed chamber through the outlet end of the first water propulsion body;

the second, lower vertical water propulsion device comprising a second water propulsion body, the second water propulsion body being directed in a vertical direction to create a second, vertical flow of water having a second turbulence; and wherein the second, lower vertical water propulsion device is positioned below the first, upper horizontal water propulsion device, such that the second, vertical flow of water combines with the first, horizontal flow of water to create a third, horizontal flow of water having a third turbulence, and wherein the third turbulence is less than the first turbulence and less than the second turbulence.

9. The system of claim 8, wherein the second water propulsion body comprises an inlet end, an outlet end in fluid communication with the recessed chamber, and at least one intake opening between the inlet end and the outlet end.

10. The system of claim 8, wherein the at least one intake opening of the second water propulsion body allows stagnant water to be pulled into the second water propulsion body through the at least one intake opening and pushed out into the recessed chamber through the outlet end of the second water propulsion body.

11. The system of claim 8, wherein the vertical direction comprises an angle between 45 degrees and 90 degrees.

12. The system of claim 8, further comprising a cover connectable to a front of the recessed chamber.

13. The system of claim 12, wherein the cover comprises an inlet for allowing water to be drawn into the recessed chamber via a Venturi effect of the first, upper horizontal water propulsion device and the second, lower vertical water propulsion device.

14. A system for circulating water in a swim spa comprising:

a recessed chamber formed in a shell of the swim spa, the recessed chamber defining a space to hold at least a portion of a first, upper horizontal water propulsion device and at least a portion of a second, lower vertical water propulsion device;

the first, upper horizontal water propulsion device comprising a first water propulsion body, the first water propulsion body being directed in a horizontal direction to create a first, horizontal flow of water having a first turbulence;

the second, lower vertical water propulsion device comprising a second water propulsion body, the second water propulsion body being directed in a vertical direction to create a second, vertical flow of water having a second turbulence; and wherein the second, lower vertical water propulsion device is positioned below the first, upper horizontal water propulsion device, such that the second, vertical flow of water combines with the first, horizontal flow of water to create a third, horizontal flow of water having a third turbulence, and wherein the third turbulence is less than the first turbulence and less than the second turbulence.

15. The system of claim 14, wherein the second, lower vertical water propulsion device comprises an inlet end, an outlet end in fluid communication with the recessed chamber, and at least one intake opening between the inlet end and the outlet end.

16. A method for circulating water in a swim spa comprising:

providing a recessed chamber formed in a shell of the swim spa, the recessed chamber defining a space to hold at least a portion of a first, upper horizontal water propulsion device and at least a portion of a second, lower vertical water propulsion device;

creating a first, upper horizontal flow of water having a first turbulence;

creating a second, lower vertical flow of water having a second turbulence; and combining the first, upper horizontal flow of water with the second, lower vertical flow of water to create a third, horizontal flow of water having a third turbulence, and wherein the third turbulence is less than the first turbulence and less than the second turbulence.

17. The method of claim 16, further comprising discharging the third, horizontal flow of water from an outlet at a head end of the swim spa into a swimming compartment, the third, horizontal flow of water flowing in a primary flow path toward a foot end of the swimming compartment.

18. The method of claim 16, further comprising pulling stagnant water into the recessed chamber via at least one intake opening of the first, upper horizontal propulsion device.

19. The method of claim 16, wherein creating a first, upper horizontal flow of water having a first turbulence comprises flowing water through a first water propulsion body of the first, upper horizontal water propulsion device.

20. The method of claim 16, wherein creating a second, lower vertical flow of water having a second turbulence comprises flowing water through a second water propulsion body of the second, lower vertical water propulsion device.

* * * * *